US004001758B2

United States Statutory Invention Registration [19]

[11] Reg. Number: H1758

Malouf et al.

[45] Published: Nov. 3, 1998

[54] MICROWAVE AMPLIFIER HAVING CROSS-POLARIZED CAVITIES

[76] Inventors: Perry M. Malouf, 5308 Carlton St., Bethesda, Md. 20816; Grigory S. Nusinovich, 9802 Montauk Ave., Bethesda, Md. 20817

[21] Appl. No.: 610,778

[22] Filed: Mar. 4, 1996

[51] Int. Cl.[6] ..... H01J 25/10

[52] U.S. Cl. ..... 315/5.39; 330/44

[58] Field of Search ..... 315/4, 5, 5.39, 315/5.43, 5.51; 330/44, 45

[56] References Cited

U.S. PATENT DOCUMENTS

| | | | |
|---|---|---|---|
| 3,457,450 | 7/1969 | Fienstein et al. | 315/5 |
| 3,488,550 | 1/1970 | Oltman, Jr. | 315/5.51 X |
| 4,567,401 | 1/1986 | Barrett et al. | 315/5.43 X |

*Primary Examiner*—Bernarr E. Gregory

[57] ABSTRACT

A multi-stage microwave gyrotwystron amplifier is disclosed having two or more stages comprising rectangular cavities to facilitate tuning. The first two stages comprise rectangular tuneable cavities that are oriented orthogonal to each other which produces a homogeneously modulated electron beam that is directed to a cylindrical output cavity which increases its power output as compared to prior art devices havig an output cylindrical cavity excited with a non-homogeneously modulated electron beam.

10 Claims, 4 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

MICROWAVE AMPLIFIER HAVING CROSS-POLARIZED CAVITIES

BACKGROUND OF THE INVENTION

The present invention relates to a microwave amplifier and, more particular, to the microwave amplifier with an increased bandwidth relative to prior art devices and having concatenated rectangular cavities that are oriented so that the polarizations of their respective enclosed fields are orthogonal to each other so as to advantageously provide a homogeneous modulated electron beam for exciting the output cavity of the microwave amplifier.

Communication, radar, and particle accelerator applications have a need for a combination of higher power microwaves at shorter wavelengths. These shorter wavelengths are described by K. J. Sleger, R. H. Abrams, Jr., and R. K. Parker in a technical article entitled "Trends in Solid State Microwave and Millimeter Wave Technology" published in *Applied Microwave,* Vol. 2, pp. 24, 27–30, 35–38, Winter 1990 and herein incorporated by reference. These shorter wavelengths are not available from conventional microwaves tubes. In particular, for communications and radar jamming, these demands are exceeding the capabilities of current, conventional, so called "slow-wave" microwave amplifier devices having an operating frequency of less than 10 GHz. A class of devices which can overcome the limitations of slow-wave amplifiers and produce high power, short wavelength microwaves are the gyrotron amplifiers, which are fast-wave devices. These fast-wave devices are described, for example, by M. Baird, in an article entitled "Gyrotron Theory" published in *High Power Microwave Sources,* eds. V. L. Granatstein and I. Alexeff, Boston: Artech House, 1987, pp. 103–184; also by V. L. Granatstein in an article entitled "Gyrotron Experiments" ibid, pp. 185–206. Both of these articles are herein incorporated by reference. Gyrotrons, as well as "slow wave" and "fast wave" circuits are also disclosed in U.S. Pat. No. 4,513,223 which is herein incorporated by reference. Further, gyrotron devices are also described in U.S Pat. Nos. 4,224,576; 4,393,332; 4,445,070; and 4,897,609, all of which are herein incorporated by reference.

High gain gyro-amplifiers typically utilize a multi-cavity klystron-like configuration, and amplification of a rf signal occurs through the cyclotron resonance maser interaction between the phase bunched beam and the microwave fields in an output cavity. These high gain gyro-amplifiers are more fully described by R. S. Symons and H. R. Jory in a technical article entitled "Cyclotron Resonance Devices" published in *Advances in Electronics and Electron Physics,* eds. L. Marton and C. Marton, New York: Academic Press, 1981, Vol. 55, pp. 1–13 and herein incorporated by reference. One particularly promising version of a gyro-amplifier is the gyrotwystron, a hybrid device combining resonator cavities as in a gyroklystron with the traveling wave section of the gyro-traveling wave tube (TWT). These cavities and wave section are isolated from one another by cut-off drift tubes producing drift regions that are cut-off to the microwaves at the operational frequency. In the operation of the hybrid device, an electron beam is first modulated by the input signal in the resonator cavity and then continues to the drift region where the electrons bunch in their orbits ballistically. The bunched beam then excites an electromagnetic wave in the output waveguide of the hybrid device. Such a device may yield both a fairly wide bandwidth and a high gain, as more fully described by M. A. Moiseev, in a technical article entitled "Maximum Amplification Band of a CRM Twystron" published in *Radiophysics and Ouantum Electronics,* Vol. 20, pp. 846–849, 1977, and herein incorporated by reference. Of course, there is a tradeoff between bandwidth and gain. To realize the large bandwidth the input cavity should have a low Q-factor, and a low cavity Q-factor implies that a higher input power is needed for efficient modulation of electron energies in the first cavity. Higher input power may cause reduction in the gain. A solution to this conflict can be found in utilization of two or more stagger tuned prebunching cavities with relatively high Q-factors.

Recently an analytical theory was developed for gyrotwystrons with relativistic electron beams, and described by G. S. Nusinovich and H. Li, in a technical article entitled "Theory of the Relativistic Gyrotwystron" published in *Phys. Fluids B,* Vol. 4, pp. 1058–1065, 1992, and herein incorporated by reference. Gyrotwystrons described in the technical article of Nusinovich, et al were considered to have the same transverse geometry at all stages, and a specific example used circular cylindrical structures for the buncher cavity and traveling wave section. At the same time, a gyrotwystron design has been proposed consisting of two rectangular cavities and a circular cylindrical traveling wave section, as more fully described by, P. M. Malouf and V. L. Granatstein, in a technical article entitled "Design and Computer Simulation of a Gyrotwystron" published in *Int. J. Electronics,* Vol. 72, pp. 943–958, 1992 and herein incorporated by reference. Rectangular cavities were used in the devices, described in the technical articles of Nusinovich, et al and Malouf, et al, because they are easy to tune. A cylindrical output waveguide section was chosen because at the specified cut-off frequency, it allows more clearance for the electron beam. To model this gyrotwystron, a gyroklystron numerical code was modified as described by G. S. Park, P. M. Malouf, V. L. Granatstein, C. M. Armstrong and A. K. Ganguly, in a technical article entitled "Realization of Improved Efficiency in a Gyroklystron Amplifier" published in *Particle Accelerators,* Vol. 43, pp. 93—105, 1993, and herein incorporated by reference.

Although the recent efforts of Nusinovich, et al and Malouf, et al improved the anticipated performance of the gyrotwystrons, it is desired that still further improvements be made to advance the anticipated performance of the gyrotwystrons, especially, to increase their operational efficiency and bandwidth so that gyrotwystrons may be more readily accepted into the communications, radar and particle accelerators fields of commercial endeavors.

OBJECTS OF THE INVENTION

Accordingly, a primary object of the present invention is to provide a gyrotwystron having improved operating efficiency and increased frequency bandwidth.

Another object of the present invention is to provide a gyrotwystron having three stages with the first two stages comprising cavities that operate so as to increase the output power produced by a cylindrical cavity serving as the third stage.

It is a further object of the present invention to provide a gyrotwystron having a cylindrical axis and comprising at least three stages, the first of which a gyrating electron beam is introduced into and modulated by an input microwave signal also introduced to the first stage, a modulated electron beam is passed onto the second and third stage, with the third stage operating in a circular polarized mode to produce amplified microwave signals.

Further still, it is an object of the present invention to provide at least a three stage gyrotwystron in which the first two stages are dimensioned as rectangular tuneable cavities that are oriented with respect to each other to provide a homogeneous modulated electron beam so as to enhance the operating efficiency of the third stage comprising a cylindrical cavity and to increase the frequency bandwidth of the gyrotwystron.

SUMMARY OF THE INVENTION

The present invention is directed to a gyrotwystron having first and second concatenated rectangular cavities with cross-polarized electric fields so as to provide a homogeneous modulated electron beam that is directed to a cylindrical output cavity.

The gyrotwystron is a microwave amplifier having a cylindrical axis and comprising a generator of an electron beam, an input waveguide for introducing a microwave signal into the amplifier, first and second concatenated rectangular cavities and a cylindrical cavity. The first rectangular cavity has first means for accepting the electron beam so that the beam is guided parallel to the cylindrical axis and second means for accepting the microwave signal. The first rectangular cavity is dimensioned to have a first predetermined polarization of its enclosed fields. The first rectangular cavity operates to modulate the electron beam by the microwave signal so as to provide an inhomogeneously modulated electron beam. The second rectangular cavity has means for accepting the inhomogeneously modulated electron beam. The second rectangular cavity is dimensioned to have a second predetermined polarization of its enclosed field which is orthogonal with respect to the first predetermined polarization. The second rectangular cavity supports a microwave field to further modulate the electron beam to provide homogeneous modulation of the electron beam. The orthogonal relationship between the first and second predetermined polarizations produces a homogeneous modulated electron beam for exciting the cylindrical cavity. The cylindrical cavity has means for accepting the homogeneous modulated electron beam which enhances the performance thereof.

BRIEF DESCRIPTION OF THE DRAWINGS

These and other objects, features and advantages of the present invention, as well as the invention itself, will become better understood by reference to the following detailed description when considered in conjunction with the accompanying drawings, wherein the same reference number designates the same or corresponding parts throughout the several views, and wherein.

DETAILED DESCRIPTION OF THE PREFERRED EMBODIMENTS

Figure 1:
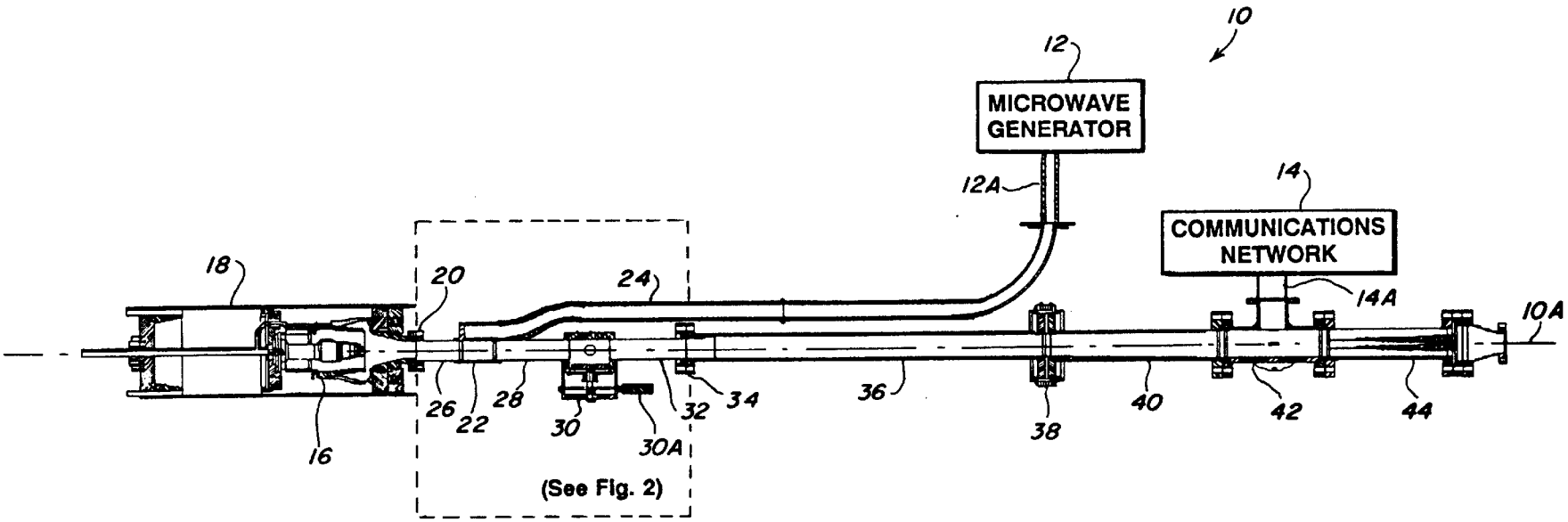
FIG. 1 is a schematic of a gyrotwystron amplifier of the present invention comprising three stage cavities, the first two dimensioned to have a transverse geometry different than the third.

With reference to the drawings, FIG. 1 illustrates a gyrotwystron microwave amplifier 10 having an efficiency of about 35% and a bandwidth of about 3% and that receives a microwave signal provided by a microwave generator 12, via associated waveguide 12A, having a frequency range wider than the invention. The microwave signal modulates an electron beam that is also introduced in the gyrotwystron microwave amplifier 10 which, in turn, produces modulated output signals that are directed to the communication network 14, via associated waveguide 14A. The communication network 14 may be replaced by radar or particle accelerator devices desiring high power microwaves at shorter wavelengths, such as those described in the "Background" section. The gyrotwystron amplifier 10 has a cylindrical axis 10A and is comprised of a plurality of elements having a reference number given in Table 1.

TABLE 1

| REFERENCE NO. | ELEMENT |
|---|---|
| 16 | MAGNETRON INJECTION GUN (MIG) |
| 18 | OIL TANK |
| 20 | HIGH VACUUM FLANGE |
| 22 | FIRST CAVITY |
| 24 | INPUT WAVEGUIDE |
| 26 | CUT-OFF DRIFT TUBE |
| 28 | CUT-OFF DRIFT TUBE |
| 30 | SECOND CAVITY |
| 32 | CUT-OFF DRIFT TUBE |
| 34 | HIGH VACUUM FLANGE |
| 36 | TRAVELING WAVE TUBE (TWT) SECTION |
| 38 | COAXIAL SECTION (DC BREAK) |
| 40 | ELECTRODE (COLLECTOR) |
| 42 | OUTPUT COUPLER |
| 44 | TERMINATOR |

The gyrotwystron amplifier 10 incorporates transmission techniques that are contrary to conventional techniques. More particularly, it is normally considered that transmission through waveguides should be arranged so that any changes to the polarization of the microwave fields are kept to a minimum. This was normally considered to insure for maximum transfer of power between input and output devices. In the previous state of the art, as more fully described in the previously mentioned technical article "Design and Computer Simulation of a Gyrotwystron" of P. M. Malouf, et al, the rectangular cavities, such as cavities 22 and 30 of FIG. 1, were aligned so that the polarization of the microwave fields inside each cavity was parallel to the polarization direction in the other cavities, such as the traveling wave tube cavity 36 of FIG. 1. For such an arrangement, the field in the rectangular cavities 22 and 30 is not free to rotate so that the polarization (that is, the direction of alignment of the electric field vectors in the cavities) is fixed. The result of such fixed polarization is that the electron beam is modulated inhomogeneously over its cross section. This inhomogeneously modulated beam disadvantageously excites the cylindrical traveling wave tube 36 which reduces its efficiency as compared to being excited by a homogeneous modulated signal. As will be described with reference to FIG. 3, the present invention orients the cavities 22 and 30 to provide for a substantially homogeneously modulated beam that excites the traveling wave tube 36 and improve its efficiency.

As seen in FIG. 1, the gyrotwystron microwave amplifier 10 receives an electron beam generated by the magnetron injection gun 16 lodged in an oil tank 18. As is known in the art, the oil tank 18 dissipates the heat of the magnetron injection gun 16. The magnetron injection gun 16 is known in the art and need not be further described herein, but if desired further details of a magnetron injection gun may be found in U.S. Pat. No. 4,224,576, herein incorporated by reference. The electron beam of the magnetron injection gun 16 is introduced, along with the microwave signal from generator 12, to the first cavity 22, which may be further described with reference to FIG. 2.

The first cavity 22, rectangular in shape, receives the electron beam, via high vacuum flange 20 and the cut-off drift tube 26, and is arranged so that the electron beam is guided in a parallel manner to the cylindrical axis 10A. Further, the remaining cavities 30 and 36, as well as the other elements of FIG. 1, are arranged so that the electron beam is made to pass through the cavities 30 and 36 along the cylindrical axis 10A. The electron beam is guided in its predetermined path by a static magnetic field created in the gyrotwystron amplifier that is parallel to the cylindrical axis 10A. The cut-off drift tube 26, as well as drift tubes 28 and 32, are known in the art and establish a drift region between the components which they interconnect, such as the first and second cavities 22 and 30.

Figure 2:
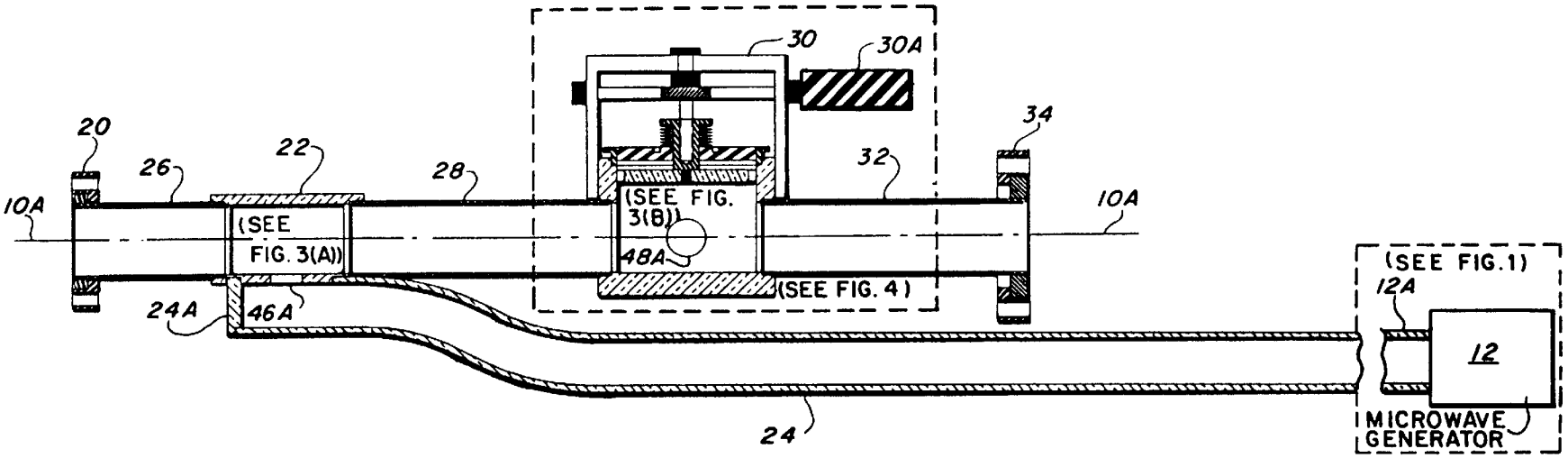
FIG. 2 is a schematic illustrating details of the first two stages of FIG. 1, each comprising a rectangular tuneable cavity.

The first rectangular cavity 22 has second means, such as coupling hole 46A, into which the microwave signal, generated by the microwave generator 12, is introduced into the first cavity 22 by way of input microwave section 24, having a waveguide shorting plug 24A arranged as shown in FIG. 2. The microwave signal is introduced, via coupling hole 46A, through the floor of the first cavity 22 to produce microwave fields, sometimes referred to herein as "rf fields," of the fundamental TE mode. The first cavity 22 provides an inhomogeneously modulated electron beam which is directed to the second cavity 30, also operating in the fundamental TE mode, by way of the drift tube 28. The second cavity 30 has a coupling hole 48A that leads into a waveguide (not shown) serving as an absorber, known in the art, and which is located behind the second cavity 30 and therefore not shown in either FIGS. 1 or 2.

In general, the first and second cavities 22 and 30 are concatenated rectangular cavities that are oriented so that the polarizations of their respective enclosed fields are orthogonal to each other so as to advantageously provide a homogeneous modulated electron beam for exciting the cylindrical traveling wave tube 36. The orientation of the first and second cavities 22 and 30 may be further described with reference to FIG. 3.

Figure 3A:
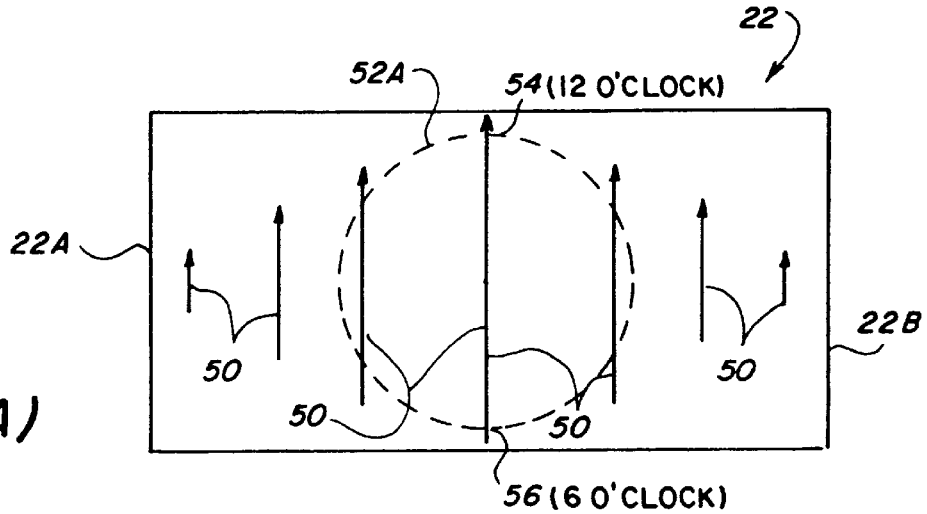
FIG. 3 is composed of FIG. 3(A) and 3(B) that respectively illustrate the polarization of the enclosed fields of the first and second rectangular tuneable cavities.
Figure 3B:
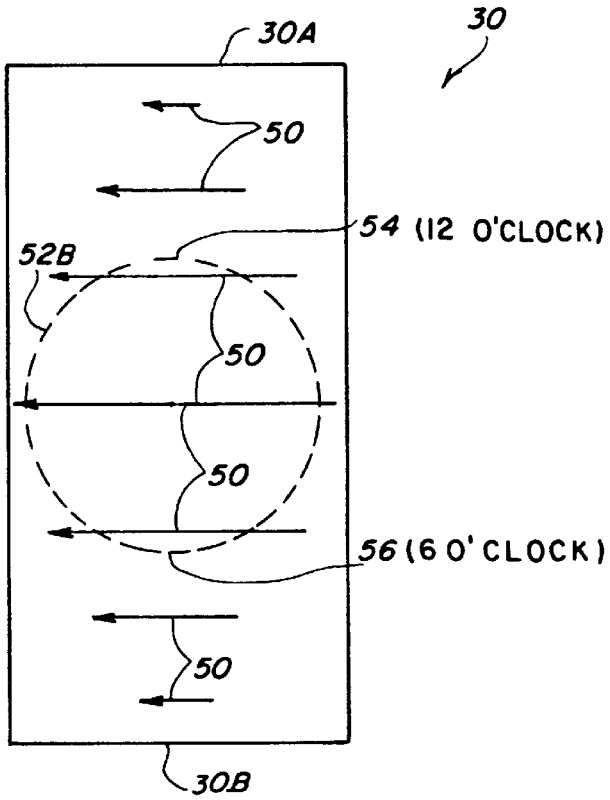

FIG. 3 is composed of FIGS. 3(A) and 3(B) that respectively illustrate the polarization of the enclosed fields of the first and second cavities 22 and 30. FIG. 3 illustrates the radio frequency (rf) electromagnetic fields in the cavities 22 and 30 by the use of arrows 50, wherein the length of the individual arrow 50 is indicative of the strength of the field with the maximum field occurring at the center of the cavities 22 and 30, and the minimum field occurring along the walls 22A and 22B of cavity 22 and along the walls 30A and 30B of cavity 30. FIG. 3 further illustrates the cross-section of electron beam 52A and 52B respectively and centrally located in the cavities 22 and 30, and each having points 54 and 56 respectively corresponding to 12 o'clock and 6 o'clock positions. As is known in the art, FIG. 3 still further illustrates that unlike cylindrical cavities having symmetrical rf electromagnetic field configurations, each of the rectangular cavities 22 and 30 has a field that is not free to rotate. More particularly, the polarization, that is, the direction of alignment of the field vectors, is fixed. For such a polarization, the cavities 22 and 30, without the benefits of the present invention, would cause inhomogeneous modulation of the electrons of the beam previously discussed with reference to the prior art arrangement of Malouf et al that utilize rectangular tuneable cavities that are oriented in alignment to each other. The present invention orients cavities 22 and 30 relative to each other in an orthogonal manner so as to provide substantially homogeneous modulation of the electron beam 52B and may be further described with reference to FIG. 3(A).

A review of FIG. 3(A) reveals that the electrons of beam 52A at the 54 point and the 56 point are in regions of a strong field, whereas the electrons at the 3 o'clock and 9 o'clock positions (not indicated in FIG. 3(A)) are in regions of a weaker field. More particularly, the electrons of beam 52A near the center of cavity 22, in correspondence with the strongest field indicated by the longest arrow 50, are modulated by a much stronger field as compared to the electrons of beam 52A near the walls 22A and 22B. Thus, some electrons are modulated strongly while other are not.

Accordingly, the electron beam 52A is modulated inhomogeneously over its cross section which is not desired. However, as to be described, the cavity 22 is concatenated with cavity 30 and cooperates with cavity 30 to provide homogeneous modulation. The cavity 22 propagates inhomogeneously modulated electron beam 52A to the cavity 30 where it excites a field and may be further described with reference to FIG. 3(B).

A review of FIG. 3(B) reveals that the second cavity 30 is similar to the first cavity 22, except it is rotated 90 degrees about the beam axis, which corresponds to the cylindrical axis 10A of FIG. 1. A further review of FIG. 3(B) also reveals that the electric field polarization of the second cavity 30 is orthogonal to the polarization of the field of the first cavity 22. The orientation of the electron beam, however, is the same as in the first cavity. More particularly, the electron beams 52A and 52B have the same orientation in their respective cavities 22 and 30.

In the second cavity 30, the electrons of beam 52B at the points 54 and 56 (12 and 6 o'clock positions) are experiencing weaker fields, while the electrons at the 3 and 9 o'clock positions (not indicated in FIG. 3(B)) experience stronger fields. This is the opposite of the situation experienced by the electron beam 52A in the first cavity 22. More importantly, this opposite situation compensates for the inhomogeneous modulation that was produced in the first cavity 22. Thus, it is possible to homogeneously modulate an electron beam with cylindrically non-symmetric structures, such as those of the rectangular concatenated cavities 22 and 30 of the present invention. The structures of the cavities 22 and 30 are oriented so that the polarizations of their respective enclosed fields are orthogonal to each other.

It should now be appreciated that the present invention provides concatenated rectangular cavities 22 and 30 that are oriented so that the polarization of their respective enclosed fields are orthogonal to each other so as to provide a homogeneous modulated electron beam for exciting the output cylindrical traveling wave tube cavity 36.

Figure 4:
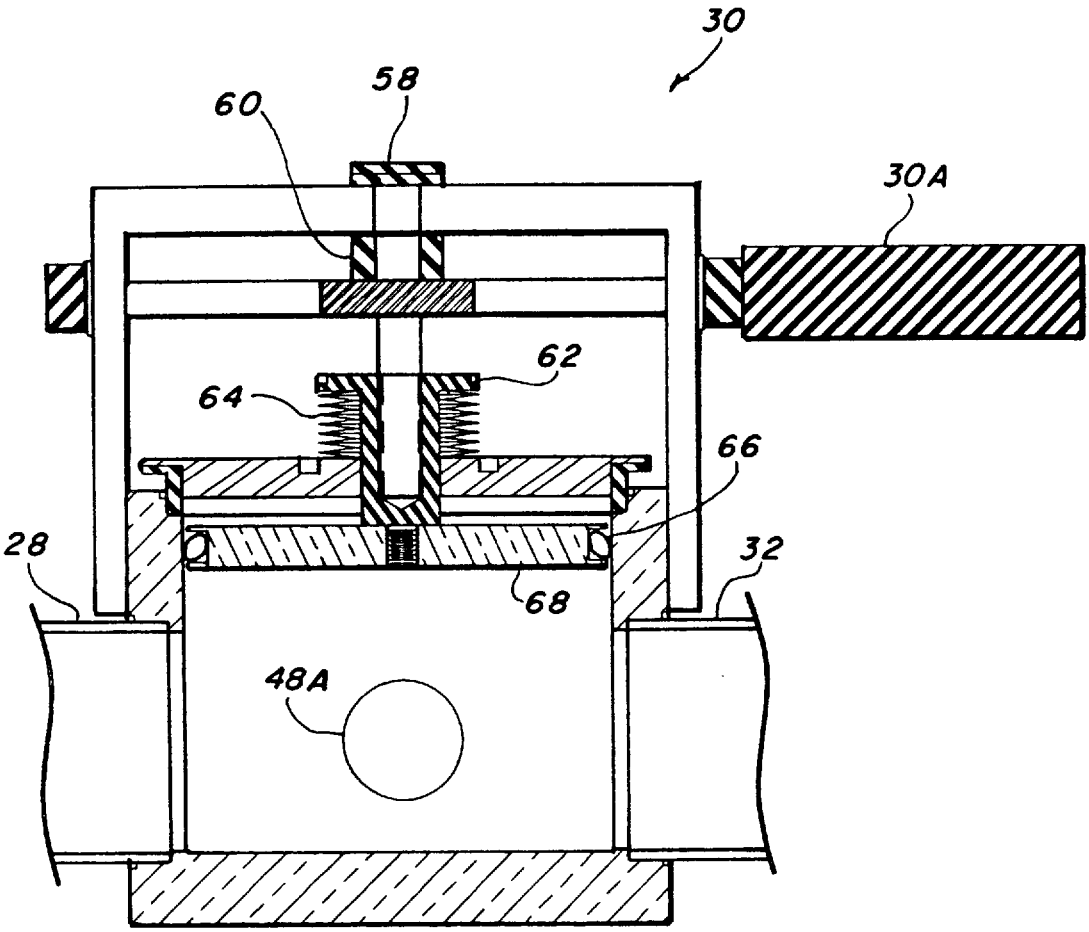
FIG. 4 is a schematic illustrating details of the tuneable first and second cavities of FIG. 2.

The first and second cavities 22 and 30 are preferably tuneable cavities. It is further preferred that these first and second cavities 22 and 30 be stagger tuned to provide a flat-top response, as known in the art. Both cavities 22 and 30 are tuneable by a tuneable knob and both tuneable cavities 22 and 30 may be further described with reference to FIG. 4 illustrating the tuneable cavity 30 having a plurality of elements given in Table 2.

TABLE 2

| REFERENCE NO. | ELEMENT |
|---|---|
| 58 | DRIVE SCREW |
| 60 | GEAR |
| 62 | THREADED PLUNGER |
| 64 | BELLOWS |
| 66 | CANTED COIL |
| 68 | MOVABLE WALL |

In operation, the tuning knob 30A is adjusted to vary the width of the second cavity 30, in a manner so as to tune it to a desired frequency. Similarly, the cavity 22 may be adjusted by moving tuning knob 22A (not shown) so as to vary its width and to tune the cavity 22 to a particular desired frequency. The tuning knob 22A is not shown in FIGS. 1 and 2 because of the view illustrated therein. The output of the second tuneable cavity 30 is directed to the traveling wave tube cavity 36, which may be further described with reference back to FIG. 1.

The traveling wave tube cavity 36 serves as a cylindrical waveguide and has input and output flanges 34 and 38, respectively, with the input flange 34 connected to the cut-off drive tube 32 and the output flange 38 connected to the electrode 40 which serves as the collector of the traveling wave tube (TWT) cavity 36. The output flange 38 also forms part of the coaxial section 36. The coaxial section 36 includes a portion comprised of capacitance in series with one of the conductors associated with flange 38. The capacitance acts to block the dc component while passing the microwave signal. The collector 40 of the traveling wave tube (TWT) cavity 36 has first and second ends, with the first end connected to the output flange 38 and the second end connected to an output coupler 42. The output coupler 42 has a flange sheltering an output window (not shown) and which flange is connected to the waveguide section 14A so that the microwave signal, available at the output coupler 42, is transferred to the communication network 14. Further, the output coupler 42 has a second end which is connected to a terminator 44 which terminates the transmission line of the gyrotwystron amplifier 10.

OPERATION OF THE GYROTWYSTRON AMPLIFIER OF THE PRESENT INVENTION

In operation, and with reference to FIG. 1, the magnetron injection gun 16 generates an electron beam which is received by the first rectangular tuneable cavity 22. An input microwave signal is generated by the microwave generator 12 and enters into the first rectangular tuneable cavity 22 by way of input waveguide 24 and microwave section 12A. The first cavity 22A operates so that the microwave signal modulates the energy of the electrons in the electron beam and produces an inhomogeneously modulated electron beam. The inhomogeneously modulated electron beam then travels to the second rectangular tuneable cavity 30 where it excites a field. Because of the orientation of cavity 30, the polarization of the microwave field in the second cavity 30 is orthogonal to the polarization of the microwave field in the first cavity 22. The microwave field in the second cavity 30 further modulates the energy of the electrons in the electron beam generated by the magnetron injection gun 16. As previously discussed with reference to FIG. 3, the second cavity 30 produces a homogeneous modulated electron beam which travels to the cylindrical output section, that is, the traveling wave tube section 36, where the homogeneous modulated electron beam excites a circularly polarized waveguide mode. The cylindrical waveguide 36, in the form of a traveling wave tube section, operating with a circularly polarized waveguide mode amplifies the second microwave signal. The amplified microwave signals are directed to the collector 40 which, in turn, directs the amplified microwave signals to the output coupler 44 so that the microwave signals may be extracted and directed to communication network 14.

The orientation of the first and second cavities 22 and 30, that is, the orientation whereby one cavity is rotated 90° about the cylindrical axis 10A relatively to the other cavity, produces an electric field polarization in the first cavity 22 which is orthogonal to the polarization of the second cavity 28 resulting in the concatenated cooperating and tuneable cavities 22 and 30 producing a homogeneous modulated output of cavity 30 that excites the field of the cylindrical cavity 36. The exciting by this homogeneous modulated signal increased the output power of the cylindrical cavity 36 relative to prior art devices each having an output cylindrical cavity that was excited by a non-homogeneous output produced by the cooperative action of two tuneable rectangular cavities having a parallel orientation.

In the practice of the present invention, computer program analyses were performed, along with mathematical studies, and it has been determined that the gyrotwystron amplifier of FIG. 1 may easily operate in a frequency of about 4.5 GHz in a range from about 4.36 GHz to about 4.65 GHz. The output waveguide, such as the cylindrical waveguide 36, can operate over a 6% bandwidth and provide an electronic efficiency of 35%. However, to realize this 6% bandwidth with only two staggered tuned cavities 22 and 30, it is necessary to have the stagger cavities with a figure of merit Q on the order of 50. If desired, the figure of merit Q may be selected to be 100 which resulted in a bandwidth of 2–3%. In some applications, such as in the communication arts, a narrower bandwidth may be desired.

It should now be appreciated that the practice of the present invention provides for a gyrotwystron amplifier 10 having an improved operating efficiency and an increased frequency bandwidth.

It should be further appreciated that the practice of the present invention provides for two or more stages having rectangular cross-section cavities so as to facilitate frequency tuning while the output stage is circular in cross-section so that a circularly polarized wave manifested in a circular polarized mode may be provided.

It should, therefore, be understood that many modifications and variations of the present invention are possible in view of the description of the claimed invention. It is, therefore, to be understood that the invention should be viewed in light of the scope of the appended claims and also that the invention may be practiced otherwise than as specifically described.

What we claim is:

1. A microwave amplifier having a cylindrical axis comprising:

(a) a generator of an electron beam;

(b) an input waveguide for introducing a microwave signal into the amplifier;

(c) a first rectangular cavity having first means for accepting said electron beam so that said beam is guided parallel to said cylindrical axis and second means for accepting said microwave signal, said first rectangular cavity being dimensioned to have a first predetermined polarization of its enclosed fields, said first rectangular cavity modulating said electron beam by said microwave signal so as to provide an inhomogeneously modulated electron beam;

(d) a second rectangular cavity having means for accepting said inhomogeneously modulated electron beam, said second rectangular cavity being dimensioned to have a second predetermined polarization of its enclosed fields, said second predetermined polarization being orthogonal with respect to said first predetermined polarization, said second rectangular cavity further modulating said electron beam by said microwave signal to provide a homogeneously modulated electron beam; and (e) a cylindrical waveguide having means for accepting said homogeneously modulated electron beam to produce a circularly polarized wave that is made available at an output of said cylindrical waveguide.

2. The microwave amplifier according to claim 1, wherein said first and second rectangular cavities are tuneable.

3. The microwave amplifier according to claim 2, wherein said first and second rectangular cavities are staggered tuned.

4. The microwave amplifier according to claim 3, wherein said first and second tuneable rectangular cavities each have a figure of merit, Q, of about 50.

5. The microwave amplifier according to claim 3, wherein said first and second rectangular cavities each have a figure of merit, Q, of about 100.

6. The microwave amplifier according to claim 1, wherein a cut-off drift tube is interposed between said first and second rectangular cavities and between said second rectangular cavity and said cylindrical waveguide.

7. The microwave amplifier according to claim 6 further comprising an output coupler.

8. The microwave amplifier according to claim 7 further comprising a transmission line terminator connected to said second end of said output coupler.

9. The microwave amplifier according to claim 1, wherein said cylindrical waveguide comprises;

(a) a traveling wave tube having input and output flanges with the input flange connected to the output of said second rectangular cavity;

(b) a coaxial section serving as a dc break having first and second ends with the first end connected to the output flange of said traveling wave tube; and (c) an electrode serving as a collector of said traveling wave tube having first and second ends with the first end connected to said second end of said dc break.

10. The microwave amplifier according to claim 1, wherein said electron beam generator comprises a magnetron injection gun that introduces said electron beam parallel to said cylindrical axis.

* * * * *